United States Patent
Yang

(10) Patent No.: US 8,529,390 B2
(45) Date of Patent: *Sep. 10, 2013

(54) INTERNAL ROCKER ARM TYPE EPICYCLE WHEEL SYSTEM WITH BIDIRECTIONAL INPUT AND UNIDIRECTIONAL OUTPUT

(76) Inventor: Tai-Her Yang, Dzan-Hwa (TW)

( * ) Notice: Subject to any disclaimer, the term of this patent is extended or adjusted under 35 U.S.C. 154(b) by 222 days.

This patent is subject to a terminal disclaimer.

(21) Appl. No.: 13/028,273

(22) Filed: Feb. 16, 2011

(65) Prior Publication Data
US 2012/0208665 A1 Aug. 16, 2012

(51) Int. Cl.
F16H 48/00 (2012.01)
F16H 48/06 (2006.01)
F16H 3/44 (2006.01)

(52) U.S. Cl.
USPC .............. 475/12; 475/230; 475/294; 475/297

(58) Field of Classification Search
USPC ................... 475/12, 230, 243, 245, 246, 294, 475/297; 74/810.1
See application file for complete search history.

(56) References Cited

U.S. PATENT DOCUMENTS
2008/0236332 A1* 10/2008 Hoose et al. ............... 74/810.1
2012/0208666 A1* 8/2012 Yang ............................ 475/12

FOREIGN PATENT DOCUMENTS
JP 2004084783 A * 3/2004
* cited by examiner

Primary Examiner — Roger Pang
(74) Attorney, Agent, or Firm — Bacon & Thomas, PLLC

(57) ABSTRACT

The present invention is provided with the inner rocker arm type epicycle wheel system and combined with a one-way transmission to construct the inner rocker arm type epicycle wheel system capable of changing the driven direction of the input shaft while the output rotary direction of a cylindrical output shaft keeps constant, and characterized in that: through the inner rocker arm type epicycle wheel system being combined with the one-way transmission, the inner rocker arm type epicycle wheel system is equipped with a transmission operational function of bidirectional input and unidirectional output, thereby the inner rocker arm type epicycle wheel system with bidirectional input and unidirectional output of the present invention enables the transmission relation between the input shafts driven in two different rotary directions status and the one-way rotation cylindrical output shaft to have the same or different transmission speed ratios, when the input shafts are driven in the first rotary direction and in the second rotary direction.

5 Claims, 1 Drawing Sheet

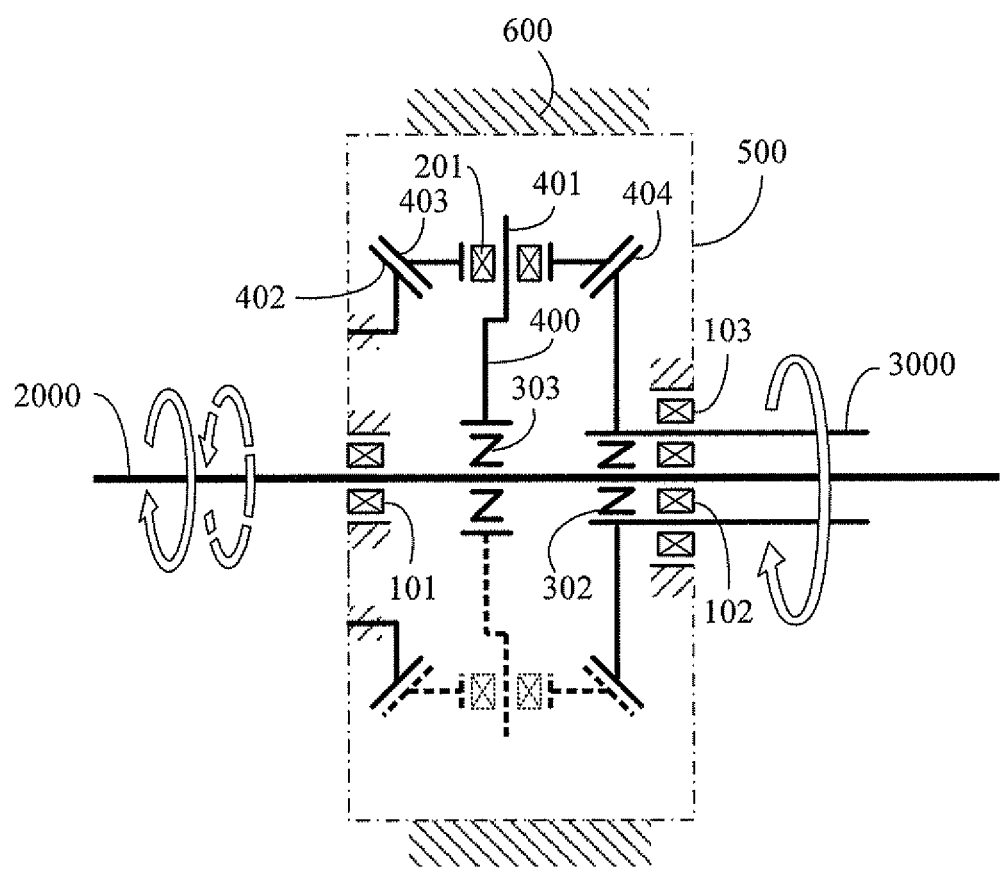

INTERNAL ROCKER ARM TYPE EPICYCLE WHEEL SYSTEM WITH BIDIRECTIONAL INPUT AND UNIDIRECTIONAL OUTPUT

BACKGROUND OF THE INVENTION (a) Field of the Invention

The present invention relates an internal rocker arm type epicycle wheel system with bidirectional input and unidirectional output, in which the inner rocker arm type epicycle wheel system is combined with a one-way transmission, so that the inner rocker arm type epicycle wheel system is equipped with a transmission operational function of bidirectional output and unidirectional input. According to the internal rocker arm type epicycle wheel system with bidirectional input and unidirectional output of this invention, when an input shaft is driven in a first rotary direction and in a second rotary direction, the transmission relation between the input shaft having two driving status of different rotary directions and the one-way rotation cylindrical output shaft can be formed as having the same or different transmission speed ratios, thereby solving the disadvantage of a concentric type bidirectional input and unidirectional output wheel system composed of a planetary transmission wheel system being retrained by an inner transmission structure which result in that the gear shift ratio of driving an input shaft and an output shaft in a first rotary direction and the gear shaft ratio of driving the input shaft and the output shaft in a second rotary direction can not be the same ratio to perform unidirectional output.

(b) Description of the Prior Art

A conventional wheel system with dual revolving directional input and fixed directional output composed of a conventional planetary gear system is retrained by an inner transmission structure which result in that the gear shift ratio of driving an input shaft and an output shaft in a first rotary direction and the gear shaft ratio of driving the input shaft and the output shaft in a second rotary direction can not be the same ratio to perform unidirectional output.

SUMMARY OF THE INVENTION

The present invention provides an internal rocker arm type epicycle wheel system with bidirectional input and unidirectional output in which the inner rocker arm type epicycle wheel system is combined with a one-way transmission for structuring the inner rocker arm type epicycle wheel system capable of changing the driven direction of the input shaft while the output rotary direction of a cylindrical output shaft is fixed, and characterized in that: through the inner rocker arm type epicycle wheel system being combined with the one-way transmission, the inner rocker arm type epicycle wheel system is equipped with a transmission operational function of bidirectional input and unidirectional output; the inner rocker arm type epicycle wheel system with bidirectional input and unidirectional output enables the transmission relation of the input shaft having two driving status of different rotary directions and the one-way rotation cylindrical output shaft to have the same or different transmission speed ratios, when the input shafts are driven in the first rotary direction and in the second rotary direction, thereby solving the disadvantage of an concentric type bidirectional input and unidirectional output wheel system composed of a planetary transmission wheel system, which is retrained by an inner transmission structure, so that the gear shift ratio of driving an input shaft and an output shaft in a first rotary direction and the gear shaft ratio of driving the input shaft and the output shaft in a second rotary direction can not be the same ratio to perform unidirectional output.

BRIEF DESCRIPTION OF THE DRAWINGS

FIG. 1 is a schematic structural view showing the internal rocker arm type epicycle wheel system according to one embodiment of the this invention;

DESCRIPTION OF MAIN COMPONENT SYMBOLS (101)、(102)、(103)、(201): Bearing
(302)、(303): One-way transmission
(400): Epicyclic gear support arm annular shelf
(401): Epicyclic gear shaft
(402): Inner bevel wheel
(403): Epicyclic gear
(404): Outer bevel wheel
(500): Shell
(600): Machine body
(2000): Input shaft
(3000): Cylindrical output shaft

DETAILED DESCRIPTION OF THE PREFERRED EMBODIMENTS

The structural status of the internal rocker arm type epicycle wheel system with bidirectional input and unidirectional output includes a structure of an input shaft and an output shaft being concentrically sleeved;

FIG. 1 is a schematic structural view showing the internal rocker arm type epicycle wheel system according to one embodiment of the this invention;

As shown in FIG. 1, the internal rocker arm type epicycle wheel system is combined with a one-way transmission and the input shaft and the output shaft are concentrically sleeved, and it mainly consists of:

Internal rocker arm type epicycle wheel set: constituted by an inner bevel wheel (402) and an outer bevel wheel (404) and at least an epicyclic gear (403), wherein bevel gears being mutually engaged to form a function of epicycle wheel set, or bevel friction wheels mutually incorporating to perform friction transmission to form the function of epicycle wheel set, and being provided with a shell (500) so as to be installed on a machine body (600), and also being provided with a rotation shaft and a bearing;

In the mentioned epicycle wheel set, the speed ratios of the inner bevel wheel (402) and the outer bevel wheel (404) are the same, and the speed ratios between the above two and the epicyclic gear (403) can be the same or different;

In the mentioned epicycle wheel set, the speed ratios of the inner bevel wheel (402) and the outer bevel wheel (404) are different, and the speed ratios between the epicyclic gear (403) and the outer bevel wheel (404) can be the same or different, and the speed ratios between the epicyclic gear (403) and the inner bevel wheel (402) can be the same or different;

one end of an input shaft (2000) is throughout installed at one side of the shell (500) of the transmission wheel system through a bearing (101), the other end of the input shaft (2000) penetrates the interior of a cylindrical output shaft (3000) through a one-way transmission (302) and a bearing (102); and another bearing (103) is installed between the cylindrical output shaft (3000) and the shell (500) of the transmission wheel system;

Shell (500) of the transmission wheel system: serving as a machinery member for structuring the internal rocker arm type epicycle wheel system with bidirectional input and unidirectional output, and the shell (500) is fastened to the machine body (600);

Machine body (600): serving as a relatively static machinery structural member;

Inner bevel wheel (402): fastened to the shell (500);

The epicyclic gear (403) is installed between the outer bevel wheel (404) and the inner bevel wheel (402); the center of the epicyclic gear (403) rotates on an epicyclic gear shaft (401) through a bearing (201); the epicyclic gear shaft (401) is combined with an epicyclic gear support arm annular shelf (400); a one-way transmission (303) is installed between the epicyclic gear support arm annular shelf (400) and the input shaft (2000);

The outer bevel wheel (404) is annularly installed on the cylindrical output shaft (3000).

The operational functions of the internal rocker arm type epicycle wheel system with bidirectional input and unidirectional output of the present invention are as followings:

When the input shaft (2000) is driven in a first rotary direction, the cylindrical output shaft (3000) performs the first rotary direction output through being driven by the one-way transmission (302) for structuring a first transmission wheel system; meanwhile, the input shaft (2000) is in an idle state through the one-way transmission (303) and the epicyclic gear support arm annular shelf (400);

When the input shaft (2000) is driven in a second rotary direction, the epicyclic gear (403) and the outer bevel wheel (404) are driven through the one-way transmission (303) and the epicyclic gear support arm annular shelf (400) to drive the cylindrical output shaft (3000) to perform the same first rotary direction output for structuring a second transmission wheel system; meanwhile, the one-way transmission (302) installed between the input shaft (2000) and the cylindrical output shaft (3000) is in an idle state;

The operational features of the internal rocker arm type epicycle wheel system with bidirectional input and unidirectional output are as following:

the first rotary direction and the second rotary direction are reverse;

if the input terminal is driven by the first rotary direction, the first rotary direction output is produced through the first transmission wheel system to drive the output terminal;

if the input terminal is driven by the second rotary direction, the first rotary direction output is produced through the second transmission wheel system to drive the output terminal;

an one-way transmission is installed between the first transmission wheel system and the second transmission wheel system to avoid the interference from the second transmission wheel system when the first transmission wheel system is used to perform the first rotary direction input and produce the first rotary direction output; and an one-way transmission is installed between the second transmission wheel system and the first transmission wheel system to avoid the interference from the first transmission wheel system when the second transmission wheel system is used to perform the second rotary direction input and produce the first rotary direction output.

According to the internal rocker arm type epicycle wheel system with bidirectional input and unidirectional output of the present invention, the bearings (101), (102), (103), (201) are composed of one of a rolling ball bearing, rolling post bearing, sleeve bearing, pneumatic bearing, magnetic levitation bearing or composed of a mixture of bearings.

According to the internal rocker arm type epicycle wheel system with bidirectional input and unidirectional output of the present invention, the epicyclic gear and support arm set structured by the epicyclic gear (403) and the bearing (201) and the epicyclic gear shaft (401) and the epicyclic gear support arm annular shelf (400) thereof can be one or more than one sets.

According to the internal rocker arm type epicycle wheel system with bidirectional input and unidirectional output of the present invention, the rotary power source of normal and reverse rotations includes one or more than one of manual force, machinery force, electric motor, hydraulic motor or pneumatic motor; including:

(1) forward and reversely driven by human power; or (2) forward and reversely driven by machine power; or (3) forward and reversely driven by hydraulic or pneumatic motors; or (4) forward and reversely driven by electric motors; or (5) driven at different directions by the rotary power sources from (1)~(4).

The invention claimed is:

1. An internal rocker arm type epicycle wheel system with bidirectional input and unidirectional output, comprising:

an epicycle gear set (500) having a shell arranged to be installed on a machine body (600), the epicycle gear set including an inner bevel wheel (402) mounted to the shell, an annular outer bevel wheel (404) installed on a cylindrical output shaft (3000), and at least one epicyclic wheel (403) rotatably mounted on an epicyclic gear shaft (401) through an epicyclic gear shaft bearing (201), said epicyclic gear shaft (401) being combined with an epicyclic gear support arm annular shelf (400) of an internal rocker arm, the at least one epicyclic gear support arm annular shelf (400) being rotatably coupled with an input shaft (2000) through a first one-way transmission (303) and the at least one epicyclic wheel (403) being rotatably coupled with the inner bevel wheel (402) and the outer bevel wheel (404), wherein speed ratios between the inner bevel wheel (402), outer bevel wheel (404), and epicyclic wheel (403) have one of the following arrangements:

(i) the inner and outer bevel wheels (402,404) rotate at the same speed and the epicyclic wheel (403) rotates at a same or different speed that the inner and outer bevel wheels (402,404);

(ii) the inner and outer bevel wheels (402,404) rotate at different speeds, the inner bevel wheel (402) rotates at a same or different speed than the epicyclic wheel (403), and the outer bevel wheel (404) rotates at a same or different speed than the epicyclic wheel (403);

wherein a first end of the input shaft (2000) is rotatably driven by the bidirectional input in a forward direction or a reverse direction and is installed at one side of the shell through a first bearing (101);

wherein a second end of the input shaft (2000) extends into an interior of the cylindrical output shaft (3000), the second end of the input shaft (2000) being rotatably coupled with the cylindrical output shaft (3000) through a second one-way transmission (302) and a second bearing (102);

wherein the cylindrical output shaft (3000) is rotatably mounted to the shell via a third bearing (103); and wherein the epicyclic gear set (500) has the following functions depending on whether the bidirectional input drives the input shaft (2000) in a forward or reverse direction:

when the input shaft (2000) is driven in a forward direction, the cylindrical output shaft (3000) is driven to rotate in a single output direction by the input shaft (2000) through the second one-way transmission (302) while the first one-way transmission (303) and epicyclic gear support arm annular shelf (400) are in an idle state; and when the input shaft (2000) is driven in a reverse direction, the cylindrical output shaft (3000) is driven to rotate in the single output direction through the first one-way transmission (303), the epicyclic gear support arm annular shelf (400), the epicyclic wheel (403), and the outer bevel wheel (404) while the second one-way transmission (302) is in an idle state.

2. An internal rocker arm type epicycle wheel system with bidirectional input and unidirectional output as claimed in claim 1, wherein the inner bevel wheel (402), the epicyclic wheel (403), and the outer bevel wheel (404) are respective bevel gears or bevel friction wheels.

3. An internal rocker arm type epicycle wheel system with bidirectional input and unidirectional output as claimed in claim 1, wherein the first, second, and third bearings (101, 102,103) and the epicyclic gear shaft bearing (201) include at least one of a rolling ball bearing, a rolling post bearing, a sleeve bearing, a pneumatic bearing, a magnetic levitation bearing, and a mixture of bearings.

4. An internal rocker arm type epicycle wheel system with bidirectional input and unidirectional output as claimed in claim 1, further comprising at least one additional epicyclic gear shaft (401) combined with the epicyclic gear support arm annular shelf, and at least one additional epicyclic wheel (403) mounted to the at least one additional epicyclic gear shaft (401) through at least one additional epicyclic gear shaft bearing (201).

5. An internal rocker arm type epicycle wheel system with bidirectional input and unidirectional output as claimed 1, wherein the bidirectional input is provided by at least one of human power, machine power, a hydraulic or pneumatic motor, and an electric motor, and wherein a same power source or different power sources are applied to the bidirectional input in the forward and reverse directions.

* * * * *